United States Patent
Seguchi

[11] Patent Number: 6,128,245
[45] Date of Patent: Oct. 3, 2000

[54] MEMORY CAPACITY SWITCHING METHOD AND SEMICONDUCTOR DEVICE TO WHICH THE SAME APPLIES

[75] Inventor: Yoshihiro Seguchi, Tokyo, Japan

[73] Assignee: Mitsubishi Denki Kabushiki Kaisha, Tokyo, Japan

[21] Appl. No.: 09/111,877

[22] Filed: Jul. 8, 1998

[30] Foreign Application Priority Data

Feb. 25, 1998 [JP] Japan ................... 10-043997

[51] Int. Cl.⁷ ...................................... G11C 8/00
[52] U.S. Cl. ................... 365/230.03; 365/225.7; 365/230.01; 365/230.02; 365/230.03; 365/200; 365/63; 711/170; 711/171; 711/172; 711/173
[58] Field of Search ................ 365/149, 225.7, 365/230.01, 230.02, 230.03, 200; 711/170, 172, 173, 63

[56] References Cited

U.S. PATENT DOCUMENTS

| | | | |
|---|---|---|---|
| 4,958,323 | 9/1990 | Sugawara et al. | 365/189.01 |
| 5,508,638 | 4/1996 | Cowles et al. | 326/38 |
| 5,621,348 | 4/1997 | Furutani et al. | 327/589 |
| 5,657,280 | 8/1997 | Shin et al. | 365/200 |
| 5,671,189 | 9/1997 | Ting et al. | 365/229 |

FOREIGN PATENT DOCUMENTS 63-121952  5/1998  Japan .

OTHER PUBLICATIONS

Advanced Electronics Series I–9, issued by Baifukan, p. 181. (English Translation of Relevant Portion).

*Primary Examiner*—David Nelms
*Assistant Examiner*—Connie C. Yoha
*Attorney, Agent, or Firm*—Burns, Doane, Swecker & Mathis, LLP

[57] ABSTRACT

A memory capacity switching method for switching capacities of an accessible memory in a semiconductor device 1 which comprises on a single chip the memory 2, a capacity switching signal generating circuit 4 for generating a capacity switching signal, and a control circuit 5 for switching capacities of the memory on the basis of the capacity switching signal. The method comprises the step of setting the capacity switching signal from the capacity switching signal generating circuit 4 either to 0 or to 1 causing the control circuit to switch the memory capacities as needed. The method and the semiconductor device for use therewith combine to shorten the time required for semiconductor device development and to reduce costs in fabricating the device.

15 Claims, 5 Drawing Sheets

FIG.3
| MEMORY ADDRESS SIGNAL | | | | | ACCESS MEMORY AREAS |
|---|---|---|---|---|---|
| 1 | 2 | 3 | 4 | 5~24 | |
| 0 | 0 | 0 | 0 | * | AREA WITH ADDRESSES 0 AND ABOVE AND BELOW 1M |
| 0 | 0 | 0 | 1 | * | AREA WITH ADDRESSES 1M AND ABOVE AND BELOW 2M |
| 0 | 0 | 1 | * | * | AREA WITH ADDRESSES 2M AND ABOVE AND BELOW 4M |
| 0 | 1 | * | * | * | AREA WITH ADDRESSES 4M AND ABOVE AND BELOW 8M |
| 1 | * | * | * | * | AREA WITH ADDRESSES 8M AND ABOVE AND BELOW 16M |
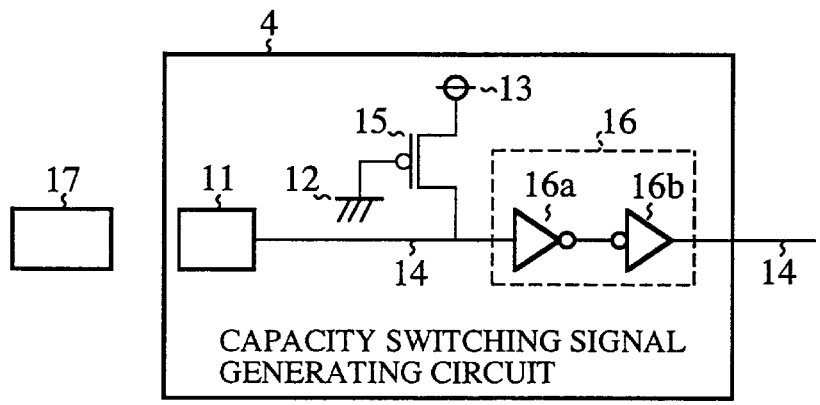
FIG.4
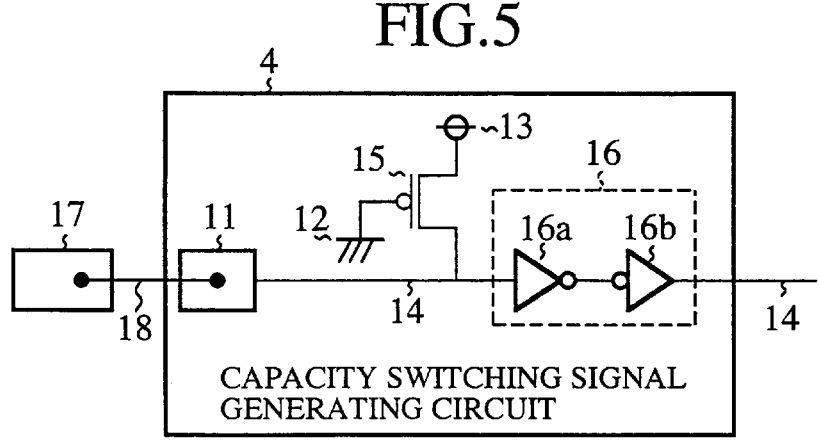
FIG.5

MEMORY CAPACITY SWITCHING METHOD AND SEMICONDUCTOR DEVICE TO WHICH THE SAME APPLIES

BACKGROUND OF THE INVENTION

1. Field of the Invention

The present invention relates to a memory capacity switching method for switching capacities of an accessible memory in a semiconductor device, as well as to a semiconductor device to which the method applies.

2. Description of the Prior Art

Recent years have seen energetic efforts to develop semiconductor devices each having a DRAM, a CPU and logic circuits mounted on a single chip. Such semiconductor devices generally have a fixed DRAM capacity each, while the size of the DRAM needed by users of these semiconductor devices varies depending on the intended application and use conditions. Under the circumstances, semiconductor devices have been developed and fabricated each incorporating a DRAM of a fixed capacity according to different user needs.

In the fabrication of DRAMs, it is customary to form spare memory cells concurrently in the same memory arrangement in preparation for possible memory cell failures in the future. In case of any memory cells subsequently becoming defective, redundant circuits are used to replace the faulty cells with spare memory cells. These cell replacements are intended not to alter the memory size but to keep the memory to its predetermined capacity as much as possible.

Because conventional semiconductor devices have their DRAM capacities fixed, the need for a specific DRAM capacity has been met by developing and fabricating semiconductor devices of that specific DRAM capacity. It takes time to develop such semiconductor devices, and the costs of fabricating the devices are high.

SUMMARY OF THE INVENTION

It is therefore an object of the present invention to overcome the above and other deficiencies and disadvantages of the prior art and to provide a method for switching capacities of an accessible memory in a semiconductor device, as well as a semiconductor device to which the method is applied.

In carrying out the invention and according to a first aspect thereof, there is provided a memory capacity switching method for switching capacities of an accessible memory in a semiconductor device which includes on a single chip the memory, a capacity switching signal generating circuit for generating a capacity switching signal, and a control circuit for switching capacities of the accessible memory on the basis of the capacity switching signal, the memory capacity switching method comprising the step of setting the capacity switching signal generated by the capacity switching signal generating circuit either to 0 or to 1 causing the control circuit to switch the memory capacities accordingly.

With the memory capacity switching method according to the first aspect of the invention, capacities of the accessible memory in the semiconductor device are switched by simply setting to 0 or 1 the capacity switching signal from the capacity switching signal generating circuit under control of the control circuit. This shortens the period of time required to develop the semiconductor device and helps lower the cost of fabricating the device.

In a preferred structure according to the second aspect of the invention, the capacity switching signal generating circuit includes a pad and a PMOS transistor, the pad being connectable to a low-potential reference power supply, a gate of the PMOS transistor being connected to the low-potential reference power supply, a source of the PMOS transistor being connected to a high-potential reference power supply, a drain of the PMOS transistor being connected to a signal line coupling the pad to the control circuit, the memory capacity switching method further comprising the step of either connecting the pad to the low-potential reference power supply or disconnecting the pad therefrom so as to set the capacity switching signal from the capacity switching signal generating circuit to either 0 or 1.

With the preferred structure above, the capacity switching signal from the capacity switching signal generating circuit is set to 0 or 1 by simply connecting or disconnecting the pad to or from the low-potential power reference power supply by means of the PMOS transistor. This makes it easy to set either to 0 or to 1 the capacity switching signal from the capacity switching signal generating circuit.

In a preferred structure according to the third aspect of the invention, the capacity switching signal generating circuit includes a pad and a resistor, the pad being connectable to a low-potential reference power supply, one end of the resistor being connected to a signal line coupling the pad to the control circuit, the other end of the resistor being connected to a high-potential reference power supply, the memory capacity switching method further comprising the step of either connecting the pad to the low-potential reference power supply or disconnecting the pad therefrom so as to set the capacity switching signal from the capacity switching signal generating circuit to either 0 or 1.

With the preferred structure above, the capacity switching signal from the capacity switching signal generating circuit is set to 0 or 1 by simply connecting or disconnecting the pad to or from the low-potential power reference power supply by means of the resistor. This also makes it easy to set either to 0 or to 1 the capacity switching signal from the capacity switching signal generating circuit.

In a preferred structure according to the fourth aspect of the invention, the pad is connected to the low-potential reference power supply through wiring furnished during assembling.

With the preferred structure above, the fact that the pad is connected to the low-potential reference power supply through wiring furnished during assembling offers the benefit of setting to 0 or to 1 the capacity switching signal from the capacity switching signal generating circuit during the fabrication process of the semiconductor device.

In a preferred structure according to the fifth aspect of the invention, the capacity switching signal generating circuit includes a first fuse which is severable and a PMOS transistor, one end of the first fuse being connected to a signal line coupled to the control circuit, the other end of the first fuse being connected to a low-potential reference power supply, a gate of the PMOS transistor being connected to the low-potential reference power supply, a source of the PMOS transistor being connected to a high-potential reference power supply, a drain of the PMOS transistor being connected to a signal line coupled to the control circuit, the memory capacity switching method further comprising the step of either severing or not severing the first fuse so as to set the capacity switching signal from the capacity switching signal generating circuit to either 0 or 1.

With the preferred structure above, the capacity switching signal from the capacity switching signal generating circuit is set to 0 or 1 by simply severing or not severing the first fuse. This also makes it easy to set either to 0 or to 1 the capacity switching signal from the capacity switching signal generating circuit.

In a preferred structure according to the sixth aspect of the invention, the capacity switching signal generating circuit includes a first and a second fuse which are severable, one end of the first fuse being connected to a signal line coupled to the control circuit, the other end of the first fuse being connected to a low-potential reference power supply, one end of the second fuse being connected to the signal line coupled to the control circuit, the other end of the second fuse being connected to a high-potential reference power supply, the memory capacity switching method further comprising the step of severing either the first fuse or the second fuse so as to set the capacity switching signal from the capacity switching signal generating circuit to either 0 or 1.

With the preferred structure above, the capacity switching signal from the capacity switching signal generating circuit is set to 0 or 1 by simply severing either the first or the second fuse. This also makes it easy to set either to 0 or to 1 the capacity switching signal from the capacity switching signal generating circuit.

In a preferred structure according to the seventh aspect of the invention, any one of the first and the second fuses is severed by laser provided during laser trimming.

With the preferred structure above, the fact that one of the fuses is severed by laser furnished during laser trimming offers the benefit of setting either to 0 or to 1 the capacity switching signal from the capacity switching signal generating circuit during the fabrication process of the semiconductor device.

According to an eighth aspect of the invention, there is provided a semiconductor device comprising on a single chip an accessible memory, a capacity switching signal generating circuit for generating a capacity switching signal, and a control circuit for switching capacities of the memory on the basis of the capacity switching signal.

With the semiconductor device according to the eighth aspect of the invention, simply setting the capacity switching signal from the capacity switching signal generating circuit to 1 or 2 enables the control switch to switch the capacities of the accessible memory on the basis of the value of the capacity switching signal. This arrangement shortens the period of time required to develop the semiconductor device and helps lower the cost of fabricating the device.

In a preferred structure according to the ninth aspect of the invention, the capacity switching signal generating circuit includes a pad and a PMOS transistor, the pad being connectable to a low-potential reference power supply, a gate of the PMOS transistor being connected to the low-potential reference power supply, a source of the PMOS transistor being connected to a high-potential reference power supply, a drain of the PMOS transistor being connected to a signal line coupling the pad to the control circuit.

With the preferred structure above, the capacity switching signal from the capacity switching signal generating circuit is set to 0 or 1 by simply connecting or disconnecting the pad to or from the low-potential power reference power supply by means of the PMOS transistor. This makes it easy to set either to 0 or to 1 the capacity switching signal from the capacity switching signal generating circuit.

In a preferred structure according to the tenth aspect of the invention, the capacity switching signal generating circuit includes a pad and a resistor, the pad being connectable to a low-potential reference power supply, one end of the resistor being connected to a signal line coupling the pad to the control circuit, the other end of the resistor being connected to a high-potential reference power supply.

With the preferred structure above, the capacity switching signal from the capacity switching signal generating circuit is set to 0 or 1 by simply connecting or disconnecting the pad to or from the low-potential power reference power supply by means of the resistor. This also makes it easy to set either to 0 or to 1 the capacity switching signal from the capacity switching signal generating circuit.

In a further preferred structure according to the eleventh aspect of the invention, the capacity switching signal generating circuit includes a first fuse which is severable and a PMOS transistor, one end of the first fuse being connected to a signal line coupled to the control circuit, the other end of the first fuse being connected to a low-potential reference power supply, a gate of the PMOS transistor being connected to the low-potential reference power supply, a source of the PMOS transistor being connected to a high-potential reference power supply, a drain of the PMOS transistor being connected to the signal line coupling the pad to the control circuit.

With the preferred structure above, the capacity switching signal from the capacity switching signal generating circuit is set to 0 or 1 by simply severing or not severing the first fuse. This also makes it easy to set either to 0 or to 1 the capacity switching signal from the capacity switching signal generating circuit.

In an even further preferred structure according to the twelfth aspect of the invention, the capacity switching signal generating circuit includes a first and a second fuse which are severable, one end of the first fuse being connected to a signal line coupled to the control circuit, the other end of the first fuse being connected to a low-potential reference power supply, one end of the second fuse being connected to the signal line coupled to the control circuit, the other end of the second fuse being connected to a high-potential reference power supply.

With the preferred structure above, the capacity switching signal from the capacity switching signal generating circuit is set to 0 or 1 by simply severing either the first or the second fuse. This also makes it easy to set either to 0 or to 1 the capacity switching signal from the capacity switching signal generating circuit.

In a preferred structure according to the thirteenth aspect of the invention, the control circuit includes: a first AND circuit for admitting an inverted part of an n-bit long memory address signal, n being an integer of at least 2, the inverted part constituting a signal made of bits up to bit m−1, m being an integer not greater than n; a NOT circuit for admitting a signal made of bit m constituting part of the n-bit long memory address signal; an OR circuit for admitting an output of the NOT circuit and the capacity switching signal from the capacity switching signal generating circuit; a second AND circuit for admitting an output of the first AND circuit and an output of the OR circuit; and a tristate buffer for outputting the memory address signal as an internal memory address signal when an output of the second AND circuit is 1.

With the preferred structure above, simply altering the value of m as desired changes the switchable capacity size of the internal accessible memory in the semiconductor device.

Other objects, features and advantages of the invention will become more apparent upon a reading of the following description and appended drawings.

BRIEF DESCRIPTION OF THE DRAWINGS

FIG. 3 is a table that lists memory address signal values as they correspond to accessible memory areas;

FIG. 4 is an explanatory view showing how the capacity switching signal from the capacity switching signal generating circuit is illustratively set to 1;

FIG. 5 is an explanatory view showing how the capacity switching signal from the capacity switching signal generating circuit is illustratively set to 0;

DETAILED DESCRIPTION OF THE PREFERRED EMBODIMENTS

Preferred embodiments of this invention will now be described with reference to the accompanying drawings.

First Embodiment

Figure 1:
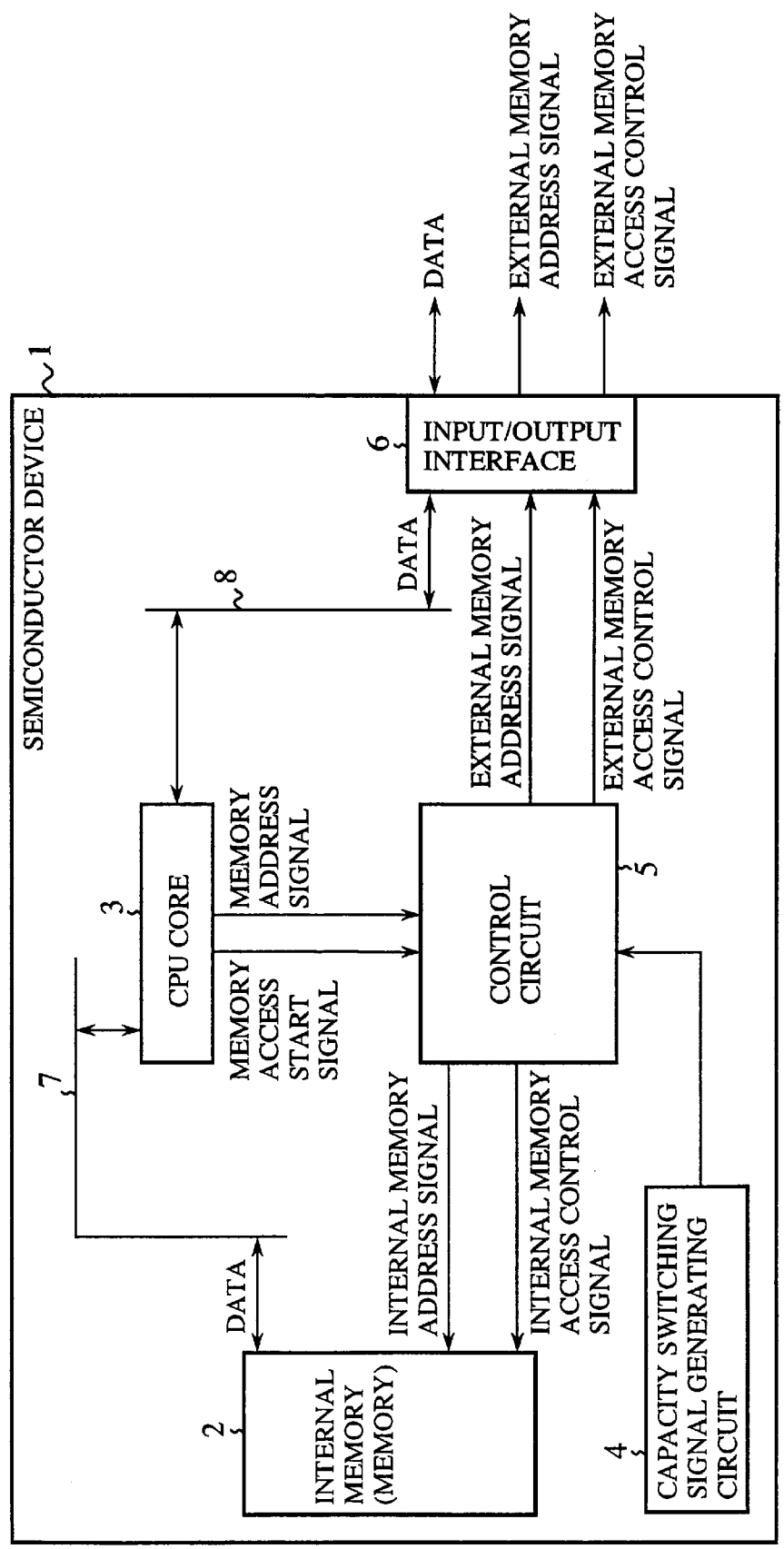
FIG. 1 is a block diagram of a semiconductor device practiced as a first embodiment of this invention.

FIG. 1 is a block diagram of a semiconductor device practiced as the first embodiment of the invention. In FIG. 1, reference numeral 1 stands for a semiconductor device; 2 for an internal memory such as a DRAM; 3 for a CPU core that carries out programs held in the internal memory 2 or programs retained in a memory furnished externally to the semiconductor device 1; 4 for a capacity switching signal generating circuit that generates a capacity switching signal; 5 for a control circuit which controls the accessed memory on the basis of a memory address signal from the CPU core 3 and a capacity switching signal from the capacity switching signal generating circuit 4 and which switches capacities of the internal memory accessed in accordance with the capacity switching signal from the capacity switching signal generating circuit 4; 6 for an input/output interface; 7 for a first data bus used to read and write data between the internal memory 2 and the CPU core 3; and 8 for a second data bus used to read and write data between the external memory and the CPU core 3 via the input/output interface 6. The semiconductor device practiced as the first embodiment incorporates on a single chip the internal memory 2, CPU core 3, capacity switching signal generating circuit 4, control circuit 5, input/output interface 6, first data bus 7 and second data bus 8.

Figure 2:
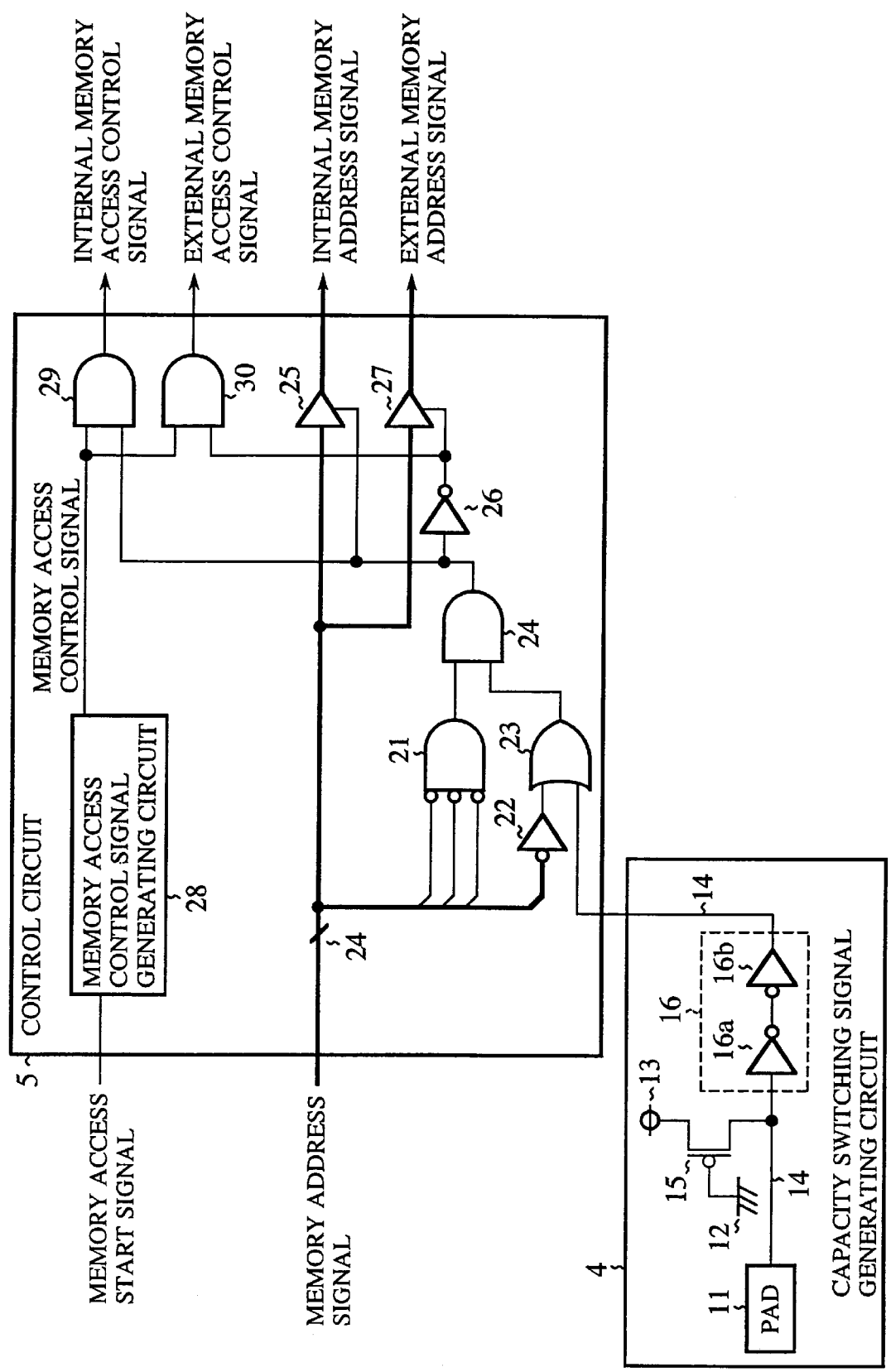
FIG. 2 is a detailed block diagram of a capacity switching signal generating circuit and a control circuit included in the first embodiment.

FIG. 2 is a detailed block diagram of the capacity switching signal generating circuit and the control circuit included in the first embodiment. In the capacity switching signal generating circuit 4, reference numeral 11 stands for a pad connectable to a low-potential reference power supply; 12 for the low-potential reference power supply; 13 for a high-potential reference power supply; 14 for a signal line coupling the pad 11 to the control circuit 5; 15 for a PMOS transistor having its gate connected to the low-potential reference power supply 12, its source connected to the high-potential reference power supply 13 and its drain connected to the signal line 14; and 16 for a buffer including a first and a second NOT circuit 16a and 16b connected serially to the signal line 14.

In the control circuit 5, reference numeral 21 stands for a first AND circuit that admits an inverted part of an n-bit long memory address signal (n is an integer of at least 2) output by the CPU core 3, the inverted part constituting a signal made of bits up to bit m−1 (m is an integer not greater than n); 22 for a third NOT circuit that admits a signal made of bit m constituting part of the n-bit long memory address signal from the CPU core 3; 23 for an OR circuit that admits an output of the third NOT circuit 22 and the capacity switching signal from the capacity switching signal generating circuit 4; 24 for a second AND circuit that admits an output of the first AND circuit 21 and an output of the OR circuit 23; and 25 for a first tristate buffer that outputs the memory address signal as an internal memory address signal when an output of the second AND circuit 24 is 1.

Reference numeral 26 stands for a fourth NOT circuit that admits the output of the second AND circuit 24; and 27 for a second testate buffer that outputs the memory address signal as an external memory address signal when an output of the fourth NOT circuit 26 is 1.

Reference numeral 28 stands for a memory access control signal generating circuit that outputs a memory access control signal when admitting a memory access start signal from the CPU core 3; 29 for a third AND circuit that outputs the memory access control signal as an internal memory access control signal upon receipt of both the memory access control signal from the memory access control signal generating circuit 28 and the output of the second AND circuit 24 and when the output of the second AND circuit 24 is 1; and 30 for a fourth AND circuit that outputs the memory access control signal as an external memory access control signal upon receipt of both the memory access control signal from the memory access control signal generating circuit 28 and the output of the fourth NOT circuit 26 and when the output of the fourth NOT circuit 26 is 1.

How the first embodiment works will now be described. In the description that follows, it is assumed that the memory address signal from the CPU core 3 is 24 bits long, and that an inverted part of the memory address signal (the part comprising bits up to bit 3) is input to the first AND circuit 21 while a signal made of bit 4 in the memory address signal is input to the third NOT circuit 22. It is also assumed for purpose of illustration that a 16-megabyte memory area is accessed by use of a 24-bit long address signal and that the internal memory 2 has physically a two-megabyte capacity.

FIG. 3 is a table that lists memory address signal values as they correspond to accessible memory areas. As shown in FIG. 3, when the values of bits 1 to 4 in the memory address signal are all 0, the memory area that may be accessed has addresses 0 and above to less than 1M; when bits 1 to 3 in the signal are all 0 and bit 4 is 1, the memory area that may be accessed has addresses 1M and above to less than 2M; when bits 1 and 2 in the signal are 0 and bit 3 is 1, the memory area that may be accessed has addresses 2M and above to less than 4M; when bit 1 in the signal is 0 and bit 2 is 1, the memory area that may be accessed has addresses 4M and above to less than 8M; when bit 1 in the signal is 1, the memory area that may be accessed has addresses 8M and above to less than 16M. In FIG. 3, an asterisk symbol (*)

indicates that the signal value represented thereby may be either 1 or 0. Address 1M is equal to address $2^{20}$. A one-byte memory area is allocated to each of the addresses constituting the memory.

FIGS. 4 and 5 are explanatory views showing how the capacity switching signal from the capacity switching signal generating circuit is illustratively set to 1 or 0. In FIGS. 4 and 5, reference numeral 17 denotes a lead terminal connected to a low-potential reference power supply. In FIG. 5, reference numeral 18 represents a wire that couples the pad 11 to the lead terminal 17.

The PMOS transistor 15 with its gate connected to the low-potential reference power supply 12 remains on and functions simply as a resistor. On one hand, if the pad 11 is not connected to the lead terminal 17 as shown in FIG. 4, the capacity switching signal generated by the capacity switching signal generating circuit 4 is set to 1. On the other hand, if the pad 11 is connected to the lead terminal 17 as depicted in FIG. 5, connecting the pad 11 to the low-potential reference power supply 12 sets to 0 the capacity switching signal from the capacity switching signal generating circuit 4.

When the pad 11 is to be connected to the lead terminal 17, the connection may be established by wiring that can be furnished during assembling. In that case, the capacity switching signal from the capacity switching signal generating circuit 4 is set to 1 or 0 as desired during the fabrication process of the semiconductor device 1 without subsequently performing any additional process for connecting the pad 11 to the lead terminal 17.

Below is a description of what takes place when the capacity switching signal from the capacity switching signal generating circuit 4 is set to 1.

When bits 1 to 3 in the memory address signal are all 0, the first AND circuit 21 outputs 1. Because the capacity switching signal has the value of 1, the OR circuit 23 outputs 1. When the first AND circuit 21 and the OR circuit 23 both output 1, the second AND circuit 24 outputs 1. With the second AND circuit 24 outputting 1, the fourth NOT circuit 26 outputs 0.

When bits 1 to 3 in the memory address signal are all 0, the second AND circuit 24 outputs 1 and the fourth NOT circuit 26 outputs 0. As a result, the memory address signal is output by the first tristate buffer 25 as an internal memory address signal to the internal memory 2, and the memory access control signal is output by the third AND circuit 29 as an internal memory access control signal to the internal memory 2. When the internal memory 2 admits both the internal memory address signal and the internal memory access control signal, the internal memory 2 and the CPU core 3 read and write data therebetween through the first data bus 7.

When any one of bits 1 to 3 in the memory address signal is 1, the first AND circuit 21 outputs 0. Because the first AND circuit 21 gives the output value of 0, the second AND circuit 24 outputs 0. With the second AND circuit 24 outputting 0, the fourth NOT circuit 26 outputs 1.

When any one of bits 1 to 3 in the memory address signal is 1, the second AND circuit 24 outputs 0 and the fourth NOT circuit 26 outputs 1. Consequently, the memory address signal is output by the second tristate buffer 27 as an external memory address signal to an external memory through the input/output interface 6, and the memory access control signal is output by the fourth AND circuit 30 as an external memory access control signal to the external memory through the input/output interface 6. When the external memory admits both the external memory address signal and the external memory access control signal, the external memory and the CPU core 3 read and write data therebetween via the second data bus 8 and the input/output interface 6.

Figure 6:
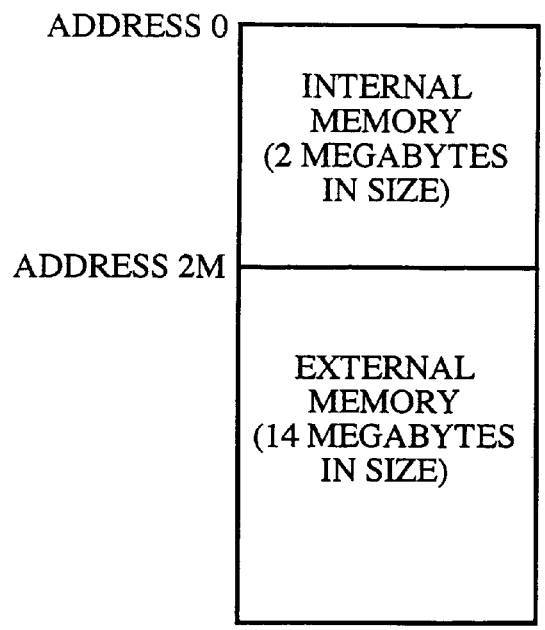
FIG. 6 is a typical memory map in effect when the capacity switching signal from the capacity switching signal generating circuit is set to 1.

When the capacity switching signal from the capacity switching signal generating circuit 4 is set to 1, the memory area with addresses 0 and above to less than 2M is allocated to the internal memory 2 and the memory area with addresses 2M and above to less than 16M is assigned to the external memory, as shown in the memory map of FIG. 6. In other words, with the capacity switching signal from the capacity switching signal generating circuit 4 set to 1, the internal memory that may be accessed is 2M in size, and the external memory that may be accessed is 14M in size. The semiconductor device 1 functions as a device incorporating a two-megabyte internal memory 2.

What follows is a description of what takes place when the capacity switching signal from the capacity switching signal generating circuit 4 is set to 0.

When bits 1 to 4 in the memory address signal are all 0, the first AND circuit 21 outputs 1 and the third NOT circuit 22 outputs 1. With the capacity switching signal set to 0 and with the third NOT circuit 22 giving the output value of 1, the OR circuit 23 outputs 1. When the first AND circuit 21 and the OR circuit 23 both output 1, the second AND circuit 24 outputs 1. With the second AND circuit 24 outputting 1, the fourth NOT circuit 26 outputs 0.

When bits 1 to 4 in the memory address signal are all 0, the second AND circuit 24 outputs 1 and the fourth NOT circuit 26 outputs 0. As a result, the memory address signal is output by the first tristate buffer 25 as an internal memory address signal to the internal memory 2, and the memory access control signal is output by the third AND circuit 29 as an internal memory access control signal to the internal memory 2. When the internal memory 2 admits both the internal memory address signal and the internal memory access control signal, the internal memory 2 and the CPU core 3 read and write data therebetween through the first data bus 7.

When bits 1 to 3 in the memory address signal are all 0 and bit 4 is 1, the first AND circuit 21 outputs 1 and the third NOT circuit 22 outputs 0. Because both the capacity switching signal and the output of the third NOT circuit 22 are set to 0, the OR circuit 23 outputs 0. With the first AND circuit 21 giving the output value of 1 while the OR circuit 23 outputs 0, the second AND circuit 24 outputs 0. Because the second AND circuit 24 outputs 0, the fourth NOT circuit 26 outputs 1.

When bits 1 to 3 in the memory address signal are all 0 and bit 4 is 1, the second AND circuit 24 outputs 0 and the fourth NOT circuit 26 outputs 1. Consequently, the memory address signal is output by the second tristate buffer 27 as an external memory address signal to the external memory through the input/output interface 6, and the memory access control signal is output by the fourth AND circuit 30 as an external memory access control signal to the external memory via the input/output interface 6. When the external memory admits both the external memory address signal and the external memory access control signal, the external memory and the CPU core 3 read and write data therebetween through the second data bus 8 and the input/output interface 6.

When any one of bits 1 to 3 in the memory address signal is 1, the first AND circuit 21 outputs 0. With the first AND circuit 21 giving the output value of 0, the second AND circuit 24 outputs 0. Because the second AND circuit 24 outputs 0, the fourth NOT circuit 26 outputs 1.

When any one of bits 1 to 3 in the memory address signal is 1, the second AND circuit 24 outputs 0 and the fourth NOT circuit 26 outputs 1. As a result, the memory address signal is output by the second tristate buffer 27 as an external memory address signal to the external memory through the input/output interface 6, and the memory access control signal is output by the fourth AND circuit 30 as an external memory access control signal to the external memory via the input/output interface 6. When the external memory admits both the external memory address signal and the external memory access control signal, the external memory and the CPU core 3 read and write data therebetween via the second data bus 8 and input/output interface 6.

Figure 7:
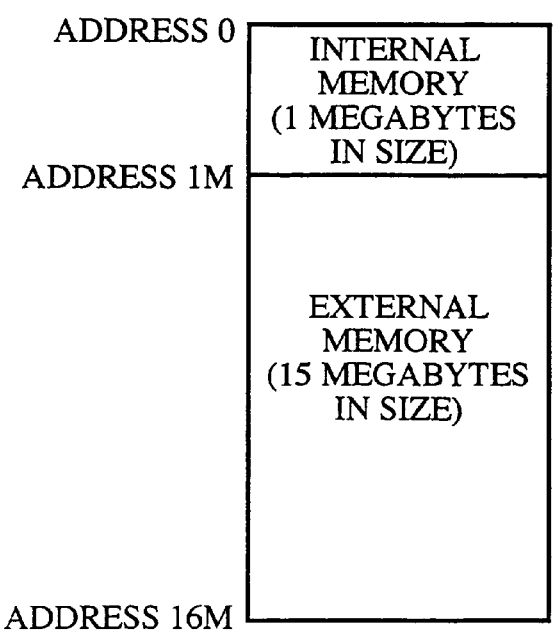
FIG. 7 is a typical memory map in effect when the capacity switching signal from the capacity switching signal generating circuit is set to 0.

When the capacity switching signal from the capacity switching signal generating circuit 4 is set to 0, the memory area with addresses 0 and above to less than 1M is allocated to the internal memory 2 and the memory area with addresses 1M and above to less than 16M is assigned to the external memory, as shown in the memory map of FIG. 7. In other words, with the capacity switching signal from the capacity switching signal generating circuit 4 set to 0, the internal memory that may be accessed is 1M in size, and the external memory that may be accessed is 15M in size. The semiconductor device 1 functions in this case as a device incorporating a one-megabyte internal memory 2.

As will be understood from the description above, the memory to be accessed is controlled by two signals: memory address signal from the CPU core 3, and capacity switching signal from the capacity switching signal generating circuit 4. With the capacity switching signal set to 1, the internal memory 2 is accessed if bits 1 to 3 in the memory address signal are all 0, or the external memory is accessed if any one of bits 1 to 3 is 1. With the capacity switching signal set to 0, the internal memory 2 is accessed if bits 1 to 4 in the memory address signal are all 0, or the external memory is accessed if any one of bits 1 to 4 is 1.

The control circuit 5 switches capacities of the internal memory 2 that may be accessed depending on the value of the capacity switching signal from the capacity switching signal generating circuit 4. When the capacity switching signal is set to 1, the internal memory 2 that may be accessed is two megabytes in capacity; when the capacity switching signal has the value of 0, the accessible internal memory 2 has a one-megabyte capacity.

As described and according to the first embodiment, setting the capacity switching signal from the capacity switching signal generating circuit 4 to either 0 or 1 switches capacities of the internal memory 2 accessed by the control circuit 5. There is no need to develop and fabricate semiconductor devices to meet each specific capacity requirement. This shortens the period of time for semiconductor device development and lowers production costs.

With the first embodiment, the capacity switching signal from the capacity switching signal generating circuit 4 is set to 0 or 1 by simply connecting or not connecting the pad 11 to the lead terminal 17. This makes it easy to set to 0 or 1 the capacity switching signal from the capacity switching signal generating circuit 4.

In addition, the control circuit 5 of the first embodiment may comprise the first AND circuit 21 for admitting an inverted part of an n-bit long memory address signal (n is an integer of at least 2), the inverted part constituting a signal made of bits up to bit m−1 (m is an integer not greater than n); the third NOT circuit 22 for admitting a signal made of bit m constituting part of the n-bit long memory address signal; the OR circuit 23 for admitting an output of the third NOT circuit 22 and the capacity switching signal from the capacity switching signal generating circuit 4; the second AND circuit 24 for admitting an output of the first AND circuit 21 and an output of the OR circuit 23; and the first tristate buffer 25 for outputting the memory address signal as an internal memory address signal when an output of the second AND circuit 24 is 1. With this structure, varying the value of m changes the switchable capacity size of the internal memory 2 that may be accessed.

Second Embodiment

The second, the third and the fourth embodiments differ from the first embodiment only in terms of the capacity switching signal generating circuit. Thus the structure and workings of the capacity switching signal generating circuit alone will be described below to characterize each of the alternative embodiments.

Figure 8:
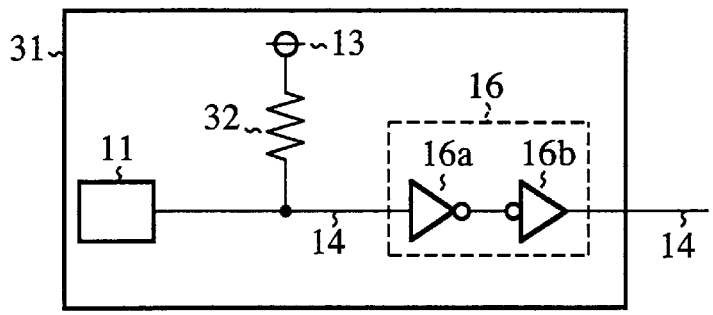
FIG. 8 is a detailed block diagram of a capacity switching signal generating circuit in a semiconductor device practiced as a second embodiment of the invention.

FIG. 8 is a detailed block diagram of a capacity switching signal generating circuit in a semiconductor device practiced as the second embodiment of the invention. In FIG. 8, reference numeral 31 denotes the capacity switching signal generating circuit, and 32 represents a resistor having one end thereof connected to the signal line 14 and the other end thereof connected to the high-potential reference power supply 13. The other components are the same as or equivalent to those having like reference numerals in FIG. 2. As illustrated, the second embodiment offers the same benefits as the first embodiment by simply substituting the resistor 32 for the PMOS transistor 15 included in the first embodiment.

Third Embodiment

Figure 9:
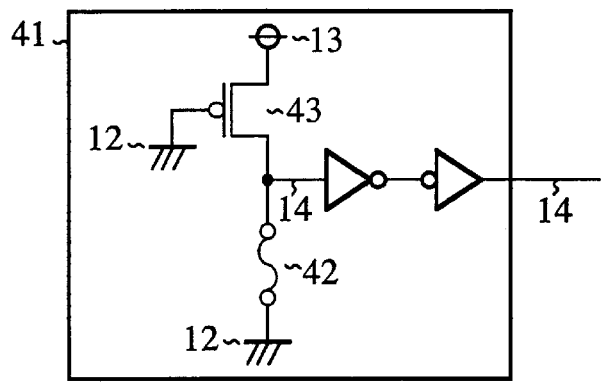
FIG. 9 is a detailed block diagram of a capacity switching signal generating circuit in a semiconductor device practiced as a third embodiment of the invention.

FIG. 9 is a detailed block diagram of a capacity switching signal generating circuit in a semiconductor device practiced as the third embodiment of the invention. In FIG. 9, reference numeral 41 stands for the capacity switching signal generating circuit; 42 for a first severable fuse having one end thereof connected to the signal line 14 and the other end thereof connected to the low-potential reference power supply 12; and 43 for a PMOS transistor having its gate connected to the low-potential reference power supply 12, its source connected to the high-potential reference power supply 13 and its drain connected to the signal line 14. The other components are the same as or equivalent to those having like reference numerals in FIG. 2.

In the capacity switching signal generating circuit 41 above, the PMOS transistor 43 with its gate connected to the low-potential reference power supply 12 remains on and functions simply as a resistor. As a result, severing the first fuse 42 sets to 1 the capacity switching signal generated by the capacity switching signal generating circuit 41. Leaving the first fuse 42 intact sets to 0 the capacity switching signal from the capacity switching signal generating circuit 41.

The first fuse 42 may optionally be made of polysilicon wiring that may be severed by laser during laser trimming. This arrangement makes it possible to set either to 1 or to 0 the capacity switching signal from the capacity switching signal generating circuit 41 during the fabrication process of the semiconductor device without adding any step specifically for severing the first fuse 42.

As described, the third embodiment offers the same advantage as the first embodiment in shortening the period of time for semiconductor device development and reducing fabrication costs. Another advantage of the third embodiment is its ability to vary the switchable capacity size of the internal memory 2 that may be accessed by allowing the value of m modified as desired.

Furthermore, according to the third embodiment, simply severing or not severing the first fuse 42 sets to 0 or 1 the capacity switching signal generated by the capacity switching signal generating circuit 41. This arrangement also makes it easy to set either to 0 or to 1 the capacity switching signal from the capacity switching signal generating circuit 41.

Fourth Embodiment

Figure 10:
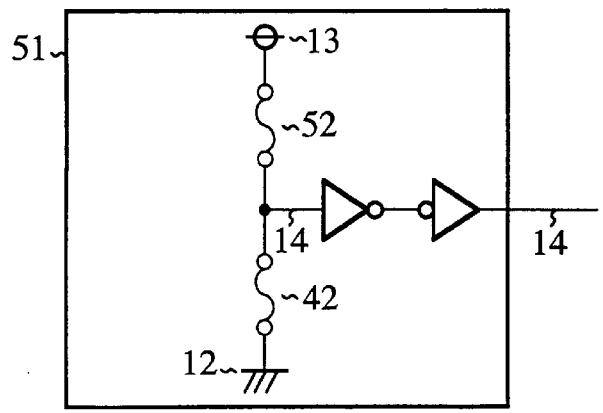
FIG. 10 is a detailed block diagram of a capacity switching signal generating circuit in a semiconductor device practiced as a fourth embodiment of the invention.

FIG. 10 is a detailed block diagram of a capacity switching signal generating circuit in a semiconductor device practiced as the fourth embodiment of the invention. In FIG. 10, reference numeral 51 denotes the capacity switching signal generating circuit, and 52 represents a second severable fuse having one end thereof connected to the signal line 14 and the other end thereof connected to the high-potential reference power supply 13. The other components are the same as or equivalent to those having like reference numerals in FIG. 9.

In the above setup, severing the first fuse 42 sets to 1 the capacity switching signal generated by the capacity switching signal generating circuit 51. Severing the second fuse 52 sets to 0 the capacity switching signal from the capacity switching signal generating circuit 51.

As described, the fourth embodiment offers the same advantage as the first embodiment in shortening the period of time for semiconductor device development and reducing fabrication costs. Another advantage of the fourth embodiment is its ability to vary the switchable capacity size of the internal memory 2 that may be accessed by allowing the value of m to be modified as desired.

Furthermore, according to the fourth embodiment, simply severing the first fuse 42 or second fuse 52 sets to 0 or to 1 the capacity switching signal generated by the capacity switching signal generating circuit 51. This arrangement also makes it easy to set either to 0 or to 1 the capacity switching signal from the capacity switching signal generating circuit 51.

It should be noted that unlike the first or second embodiment, the third and the fourth embodiments have no need for the pad 11. The absence of the pad 11 translates into less space for the capacity switching signal generating circuit in the third and the fourth embodiments than in the first and the second embodiments.

As many apparently different embodiments of this invention may be made without departing from the spirit and scope thereof, it is to be understood that the invention is not limited to the specific embodiments thereof except as defined in the appended claims.

What is claimed is:

1. A memory capacity switching method for switching capacities of an accessible memory in a semiconductor device which includes, on a single chip, the memory, a capacity switching signal generating circuit for generating a capacity switching signal, and a control circuit for switching capacities of said accessible memory on the basis of said capacity switching signal, said memory capacity switching method comprising the step of:

setting said capacity switching signal generated by said capacity switching signal generating circuit either to 0 or to 1 causing said control circuit to switch the memory capacities accordingly.

2. A memory capacity switching method according to claim 1, wherein said capacity switching signal generating circuit includes a pad and a PMOS transistor, said pad being connectable to a low-potential reference power supply, a gate of said PMOS transistor being connected to said low-potential reference power supply, a source of said PMOS transistor being connected to a high-potential reference power supply, a drain of said PMOS transistor being connected to a signal line coupling said pad to said control circuit, said memory capacity switching method further comprising the step of:

either connecting said pad to said low-potential reference power supply or disconnecting said pad therefrom so as to set said capacity switching signal from said capacity switching signal generating circuit to either 0 or 1.

3. A memory capacity switching method according to claim 2, wherein said pad is connected to said low-potential reference power supply through wiring furnished during assembling.

4. A memory capacity switching method according to claim 1, wherein said capacity switching signal generating circuit includes a pad and a resistor, said pad being connectable to a low-potential reference power supply, one end of said resistor being connected to a signal line coupling said pad to said control circuit, the other end of said resistor being connected to a high-potential reference power supply, said memory capacity switching method further comprising the step of:

either connecting said pad to said low-potential reference power supply or disconnecting said pad therefrom so as to set said capacity switching signal from said capacity switching signal generating circuit to either 0 or 1.

5. A memory capacity switching method according to claim 4, wherein said pad is connected to said low-potential reference power supply through wiring furnished during assembling.

6. A memory capacity switching method according to claim 1, wherein said capacity switching signal generating circuit includes a first fuse which is severable and a PMOS transistor, one end of said first fuse being connected to a signal line coupled to said control circuit, the other end of said first fuse being connected to a low-potential reference power supply, a gate of said PMOS transistor being connected to said low-potential reference power supply, a source of said PMOS transistor being connected to a high-potential reference power supply, a drain of said PMOS transistor being connected to a signal line coupled to said control circuit, said memory capacity switching method further comprising the step of:

either severing or not severing said first fuse so as to set said capacity switching signal from said capacity switching signal generating circuit to either 0 or 1.

7. A memory capacity switching method according to claim 6, wherein said first fuse is severed by laser provided during laser trimming.

8. A memory capacity switching method according to claim 1, wherein said capacity switching signal generating circuit includes a first and a second fuse which are severable, one end of said first fuse being connected to a signal line coupled to said control circuit, the other end of said first fuse being connected to a low-potential reference power supply, one end of said second fuse being connected to said signal line coupled to said control circuit, the other end of said second fuse being connected to a high-potential reference power supply, said memory capacity switching method further comprising the step of:

severing either said first fuse or said second fuse so as to set said capacity switching signal from said capacity switching signal generating circuit to either 0 or 1.

9. A memory capacity switching method according to claim 8, wherein any one of said first and said second fuses is severed by laser provided during laser trimming.

10. A semiconductor device comprising on a single chip an accessible memory, a capacity switching signal generating circuit for generating a capacity switching signal, and a control circuit for switching capacities of said accessible memory on the basis of said capacity switching signal.

11. A semiconductor device according to claim 10, wherein said capacity switching signal generating circuit includes a pad and a PMOS transistor, said pad being connectable to a low-potential reference power supply, a gate of said PMOS transistor being connected to said low-potential reference power supply, a source of said PMOS transistor being connected to a high-potential reference power supply, a drain of said PMOS transistor being connected to a signal line coupling said pad to said control circuit.

12. A semiconductor device according to claim 10, wherein said capacity switching signal generating circuit includes a pad and a resistor, said pad being connectable to a low-potential reference power supply, one end of said resistor being connected to a signal line coupling said pad to said control circuit, the other end of said resistor being connected to a high-potential reference power supply.

13. A semiconductor device according to claim 10, wherein said capacity switching signal generating circuit includes a first fuse which is severable and a PMOS transistor, one end of said first fuse being connected to a signal line coupled to said control circuit, the other end of said first fuse being connected to a low-potential reference power supply, a gate of said PMOS transistor being connected to said low-potential reference power supply, a source of said PMOS transistor being connected to a high-potential reference power supply, a drain of said PMOS transistor being connected to said signal line coupling said pad to said control circuit.

14. A semiconductor device according to claim 10, wherein said capacity switching signal generating circuit includes a first and a second fuse which are severable, one end of said first fuse being connected to a signal line coupled to said control circuit, the other end of said first fuse being connected to a low-potential reference power supply, one end of said second fuse being connected to said signal line coupled to said control circuit, the other end of said second fuse being connected to a high-potential reference power supply.

15. A semiconductor device according to claim 10, wherein said control circuit includes:

a first AND circuit for admitting an inverted part of an n-bit long memory address signal, n being an integer of at least 2, said inverted part constituting a signal made of bits up to bit m−1, m being an integer not greater than n;

a NOT circuit for admitting a signal made of bit m constituting part of said n-bit long memory address signal;

an OR circuit for admitting an output of said NOT circuit and said capacity switching signal from said capacity switching signal generating circuit;

a second AND circuit for admitting an output of said first AND circuit and an output of said OR circuit; and a tristate buffer for outputting the memory address signal as an internal memory address signal when an output of said second AND circuit is 1.

* * * * *